United States Patent
Ohkubo et al.

(10) Patent No.: US 12,444,424 B2
(45) Date of Patent: Oct. 14, 2025

(54) SOUND DATA PROCESSING DEVICE AND SOUND DATA PROCESSING METHOD

(71) Applicant: Nissan Motor Co., Ltd., Kanagawa (JP)

(72) Inventors: Shota Ohkubo, Kanagawa (JP); Hirofumi Inoue, Kanagawa (JP); Masaki Okamoto, Kanagawa (JP); Jo Nishiyama, Kanagawa (JP); Jun Kasai, Kanagawa (JP); Takehito Teraguchi, Kanagawa (JP); Yu Shikoda, Kanagawa (JP); Fangge Chen, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 283 days.

(21) Appl. No.: 17/907,037

(22) PCT Filed: Mar. 25, 2020

(86) PCT No.: PCT/IB2020/000323
§ 371 (c)(1),
(2) Date: Sep. 22, 2022

(87) PCT Pub. No.: WO2021/191651
PCT Pub. Date: Sep. 30, 2021

(65) Prior Publication Data
US 2023/0121586 A1     Apr. 20, 2023

(51) Int. Cl.
*G10L 17/22*     (2013.01)
*G06F 3/01*      (2006.01)
(Continued)

(52) U.S. Cl.
CPC .............. *G10L 17/22* (2013.01); *G06F 3/013* (2013.01); *G06V 20/59* (2022.01); *G06V 40/28* (2022.01)

(58) Field of Classification Search
CPC ......... G10L 17/22; G06F 3/013; G06V 20/59; G06V 40/28; H04R 3/005; H04R 5/027; H04R 2430/21; H04R 3/12
See application file for complete search history.

(56) References Cited

U.S. PATENT DOCUMENTS 10,755,691 B1 * 8/2020 Herman ........... G10K 11/17853
11,127,265 B1 * 9/2021 Kimchi ................. H04R 1/025
(Continued)

FOREIGN PATENT DOCUMENTS

JP    2005316704 A   * 11/2005
JP    2013-034122 A    2/2013
(Continued)

OTHER PUBLICATIONS

International Search Report for corresponding International Application No. PCT/IB2020/000323, mailed Aug. 4, 2020 (5 pages).
(Continued)

*Primary Examiner* — Andrew C Flanders
*Assistant Examiner* — Cameron Kenneth Young
(74) *Attorney, Agent, or Firm* — Osha Bergman Watanabe & Burton

(57) ABSTRACT

A sound data processing device includes: a sound data acquisition unit configured to acquire first sound data that is data about a sound whose sound image is localized in a cabin of a vehicle; an object specifying unit configured to specify an attention object that is an object to which an occupant of the vehicle directs attention; a sound data processing unit configured to generate second sound data that is data about the sound for which a sound relating to the attention object is emphasized in comparison with the first sound data; and a sound data output unit configured to output the second sound data to an output device that outputs a sound to the occupant.

13 Claims, 12 Drawing Sheets

(51) Int. Cl.
*G06V 20/59* (2022.01)
*G06V 40/20* (2022.01)

(56) References Cited

U.S. PATENT DOCUMENTS

| | | | |
|---|---|---|---|
| 2013/0030801 A1* | 1/2013 | Fallat | H04R 3/005 704/226 |
| 2013/0034253 A1* | 2/2013 | Nakayama | H04S 3/002 381/302 |
| 2018/0262834 A1* | 9/2018 | Cho | G06F 3/16 |
| 2020/0204966 A1* | 6/2020 | Thagadur Shivappa | G06F 3/013 |
| 2021/0127204 A1* | 4/2021 | Porta | G06N 20/20 |
| 2021/0185470 A1* | 6/2021 | Salehin | H04R 5/033 |
| 2021/0314714 A1* | 10/2021 | Kobayashi | G06F 3/165 |

FOREIGN PATENT DOCUMENTS

| | | | | |
|---|---|---|---|---|
| JP | 2015071320 A | * | 4/2015 | |
| JP | 2019068237 A | * | 4/2019 | |
| WO | WO-2016118656 A1 | * | 7/2016 | G10K 11/175 |
| WO | WO-2020027061 A1 | * | 2/2020 | H04R 27/00 |

OTHER PUBLICATIONS

Written Opinion for corresponding International Application No. PCT/IB2020/00323, mailed Aug. 4, 2020 (4 pages).

* cited by examiner

SOUND DATA PROCESSING DEVICE AND SOUND DATA PROCESSING METHOD

TECHNICAL FIELD

The present invention relates to a sound data processing device and a sound data processing method.

BACKGROUND ART

A surrounding situation notification device is known, which collects surrounding sounds around the outside of a vehicle and reproduces the sound and voice information obtained by the sound collection as a sound that is localized inside the vehicle (Patent Document 1). This surrounding situation notification device determines an attention direction that is the direction in which the attention degree for the driver is particularly high in the surrounding directions of the vehicle. Then, the surrounding situation notification device reproduces a sound so that the sound localized in the attention direction is emphasized more than the sound localized in a direction other than the attention direction around the vehicle.

PRIOR ART DOCUMENT

Patent Document

[Patent Document 1] JP2005-316704A

SUMMARY OF INVENTION

Problems to be Solved by Invention

In the prior art, a specific sound outside the vehicle is reproduced so as to be emphasized more than other sounds outside the vehicle, but the sound inside the vehicle is conveyed to an occupant of the vehicle without any change. Therefore, for example, even when the occupant tries to carefully listen to a specific sound inside the vehicle, it may be difficult to listen to the sound.

A problem to be solved by the present invention is to provide a sound data processing device and a sound data processing method that allow an occupant of a vehicle to easily listen to a specific sound inside the vehicle.

Means for Solving Problems

The present invention solves the above problem through acquiring first sound data that is data about a sound whose sound image is localized in a cabin of a vehicle, specifying an attention object that is an object to which an occupant directs attention, generating second sound data that is data about the sound whose sound image is localized and for which a sound relating to the attention object is emphasized in comparison with the first sound data, and outputting the second sound data to an output device that outputs a sound to the occupant.

Effect of Invention

According to the present invention, the occupant of the vehicle can easily listen to a specific sound inside the vehicle.

MODE(S) FOR CARRYING OUT THE INVENTION

Hereinafter, embodiments of the sound data processing device and sound data processing method according to the present invention will be described with reference to the drawings.

First Embodiment

Figure 1:
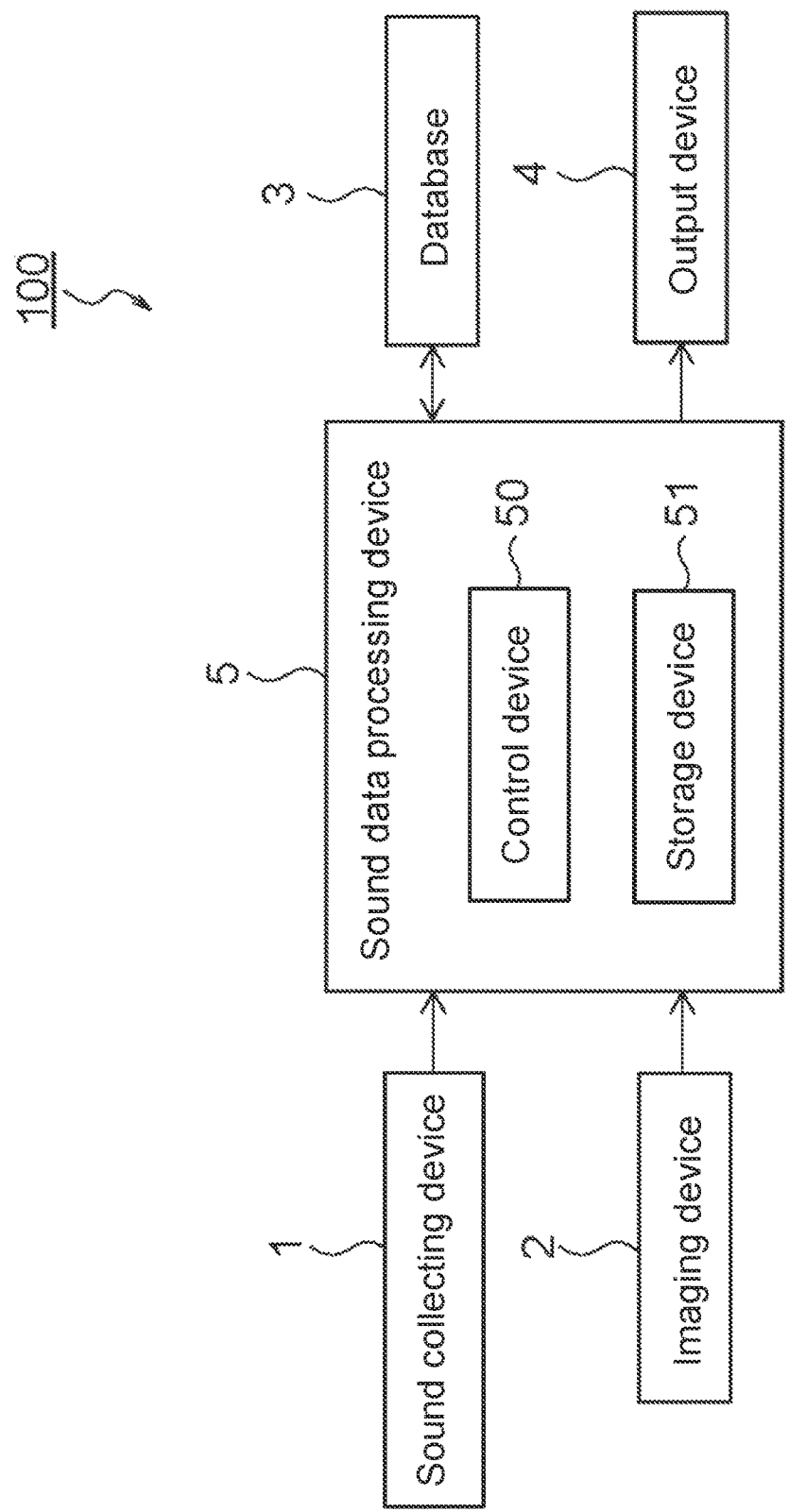
FIG. 1 is a block diagram illustrating an example of a sound output system including a sound data processing device according to a first embodiment.

In the present embodiment, a sound output system equipped in a vehicle will be described as an example. FIG. 1 is a block diagram illustrating an example of a sound output system 100 including a sound data processing device 5 according to the first embodiment.

As illustrated in FIG. 1, the sound output system 100 includes a sound collecting device 1, an imaging device 2, a database 3, an output device 4, and the sound data processing device 5. These devices are connected by a controller area network (CAN) or other onboard LAN to exchange information with one another. These devices may be connected with one another not only by an onboard LAN such as a CAN but also by other wired LAN or wireless LAN.

The sound output system 100 is a system that outputs a sound to a person on board the vehicle. The sound output by the sound output system 100 will be described later. Although not illustrated, the vehicle is also equipped with a voice dialogue system, a notification system, a warning system, a car audio system, etc. In the following description, for descriptive purposes, an occupant of the vehicle will also be simply referred to as an occupant.

The voice dialogue system is a system for having a dialogue with an occupant using a voice recognition technique and a voice synthesis technique. The notification system is a system for notifying an occupant of information about devices equipped in the vehicle by using a notification sound. The warning system is a system for warning an occupant of the predicted danger to the vehicle by using a warning sound. The car audio system is a system for being connected, for example, to a recording medium on which music or the like is recorded, thereby to play the music or the like recorded on the recording medium. The sound data processing device 5, which will be described later, is connected to these onboard systems via a given network.

In the present embodiment, the position of a seat in which an occupant sits is not particularly limited. The number of occupants is also not particularly limited, and the sound output system 100 outputs a sound to one or more occupants.

Each configuration included in the sound output system 100 will be described.

The sound collecting device 1 is provided in the cabin of the vehicle and collects sounds which an occupant hears in the cabin of the vehicle. The sounds collected by the sound collecting device 1 are mainly sounds whose sound sources are located in the cabin of the vehicle. Examples of the sounds collected by the sound collecting device 1 include a dialogue between occupants, a dialogue between the voice dialogue system and an occupant, a voice guidance provided by the voice dialogue system, a notification sound provided by the notification system, a warning sound provided by the warning system, and an audio sound provided by the audio system. The sounds collected by the sound collecting device 1 may include sounds whose sound sources are located in the outside of the vehicle (e.g., an engine sound of another vehicle). In the following description, the wording "in the cabin of the vehicle may be replaced with "inside the vehicle or in-vehicle." Likewise, the wording "in the outside of the vehicle" may be replaced with "outside the vehicle."

The sound collecting device 1 collects sounds whose sound images are localized in the cabin of the vehicle. A sound whose sound image is localized is a sound for which the direction of the sound source and the distance to the sound source can be determined when a person listens to the sound. In other words, in the case of a sound whose sound image is localized at a certain position with reference to a person, when the person listens to the sound, he/she feels as if the sound source is at the certain position and the sound is output from that position. Examples of the technique for collecting such a sound whose sound image is localized include binaural recording. In the binaural recording, the sound in a state of reaching a person's eardrums is recorded.

Examples of the sound collecting device 1 include a binaural microphone, but its form is not particularly limited. For example, when the type of the sound collecting device 1 is an earphone type, the sound collecting device 1 is attached to each of the right and left ears of an occupant. In the earphone type, the earphones are provided with respective microphones, and the sound captured by each of the right and left ears of the occupant can be collected. As a type capable of being worn by an occupant, the sound collecting device 1 may be of a headphone type capable of being mounted on the occupant's head.

When the type of the sound collecting device 1 is a dummy head type, for example, the sound collecting device 1 is provided at a place corresponding to the head of an occupant when sitting in the seat. Examples of the place corresponding to the head of an occupant include the vicinity of a headrest. The dummy head is a recorder in the shape of a human head. In the dummy head type, microphones are provided at the ear portions of the dummy head, and the sound can be collected as if it is captured by the right and left ears of an occupant.

As described previously, the sound whose sound image is localized is a sound for which a person can determine the direction of the sound source and the distance to the sound source; therefore, even when the same sound is output from the sound source, how the person feels about the direction of the sound source and the distance to the sound source varies depending on the positional relationship between the person and the sound source. In the present embodiment, therefore, the vehicle is provided with the same number of sound collecting devices 1 as the number of seats of the vehicle. Additionally or alternatively, in the present embodiment, the sound collecting devices 1 are provided at the same positions as the positions of the seats of the vehicle. This allows the sound data including information on the direction of a sound source and the distance to the sound source, which are felt by each occupant, to be acquired without depending on the locations of sound sources or the number of the sound sources.

The description will be made for an exemplary case in which, for example, there are two seats (driver seat and front passenger seat) in the front of the vehicle and two seats (rear seats) in the rear of the vehicle. The sound collecting device 1 is provided in each seat. It is assumed that speakers are provided in the front and right and left sides in the cabin of the vehicle and, for example, music is played in the cabin. In this example, when the front speaker is closer to the occupant sitting in the driver seat (seat on the front right side) than the speakers on the right and left sides, the occupant feels that the sound source of the sound coming from the front to himself/herself is closer than the sound sources of the sounds coming from the right and left to himself/herself. In addition, this occupant feels that the sound source of the sound coming from the right to himself/herself is closer than the sound source of the sound coming from the left to himself/herself. The sound collecting device 1 provided in the driver seat can collect the sound in a state of coming up to the eardrums of the occupant sitting in the driver seat.

The sound collecting device 1 converts the collected sounds into corresponding sound signals and outputs the converted sound signals as sound data to the sound data processing device 5. This allows the sound data processing device 5 to execute data processing of the collected sounds. The sound data output from the sound collecting device 1 to the sound data processing device 5 includes information that allows an occupant to determine the direction of a sound source and the distance to the sound source. When the sound collecting device 1 is provided for each seat, the sound data is output from each sound collecting device 1 to the sound data processing device 5. It is assumed that the sound data processing device 5 can determine which seat provided with the sound collecting device 1 the sound data comes from.

The imaging device 2 captures an image in the cabin of the vehicle. The captured image captured by the imaging device 2 is output to the sound data processing device 5. Examples of the imaging device 2 include a camera provided with a CCD element. The type of image captured by the imaging device 2 is not limited, and it suffices that the imaging device 2 has a function of capturing at least one of a still image and a moving image.

For example, the imaging device 2 is provided at a position at which an occupant can be imaged in the cabin of the vehicle, and images the appearance of the occupant. The place at which the imaging device 2 is provided and the number of imaging devices 2 are not particularly limited. For example, the imaging device 2 may be provided for each seat or may otherwise be provided at a position from which the entire cabin can be viewed.

The database 3 stores positional information of sound sources in the cabin of the vehicle and in-vehicle space information regarding the sound sources in the cabin of the vehicle. In the following description, for descriptive purposes, the positional information of sound sources in the cabin of the vehicle will also be simply referred to as the positional information of sound sources. Also for descriptive purposes, the in-vehicle space information regarding the sound sources in the cabin of the vehicle will also be simply referred to as the in-vehicle space information.

Sound sources in the cabin of the vehicle include speakers and persons (occupants). The positional information of a sound source indicates the installation position of a speaker or the position of the head of an occupant in a state of sitting in the seat. Specific examples of the positional information of sound sources will be described later. The in-vehicle space information refers to information used to associate an object in the cabin of the vehicle to which an occupant directs attention with a sound source in the cabin of the vehicle. Specific examples of the in-vehicle space information will be described later. The database 3 outputs the positional information of sound sources and the in-vehicle space information to the sound data processing device 5 in response to an access from the sound data processing device 5.

Sound data is input to the output device 4 from the sound data processing device 5. The output device 4 generates a reproduced sound based on the sound data and outputs the reproduced sound as stereophonic sound.

For example, when the sound data output from the sound data processing device 5 to the output device 4 includes stereo recording signals, the output device 4 outputs the reproduced sound using a stereo scheme. In this case, examples of the output device 4 include speakers. The installation location of the output device 4 and the number of output devices 4 to be installed are not particularly limited. The output devices 4 are provided in the cabin of the vehicle as many as the number of output devices 4 that can output the reproduced sound as stereophonic sound. Additionally or alternatively, the output devices 4 are provided at predetermined positions in the cabin of the vehicle so that the reproduced sound can be output as stereophonic sound. For example, the output device 4 is provided for each seat in order to give different stereophonic sound to each occupant. This makes it possible to reproduce the sound as if it is captured by the right and left ears of each occupant.

The output device 4 may be a device other than a speaker. For example, when the sound data output from the sound data processing device 5 to the output device 4 includes binaural recording signals, the output device 4 outputs the reproduced sound using a binaural scheme. In this case, examples of the output device 4 include earphones that can be attached to both ears and headphones that can be mounted on a head. For example, the output device 4 is attached to or worn by each occupant in order to give different stereophonic sound to each occupant. This makes it possible to reproduce the sound as if it is captured by the right and left ears of each occupant.

The sound data processing device 5 is composed of a computer provided with hardware and software. Specifically, the sound data processing device 5 is composed of a read only memory (ROM) that stores programs, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as the operation circuit. A control device 50 illustrated in FIG. 1 corresponds to the CPU, and a storage device 51 illustrated in FIG. 1 corresponds to the ROM and RAM. In the present embodiment, the sound data processing device 5 is provided as a module in the vehicle.

Figure 2:
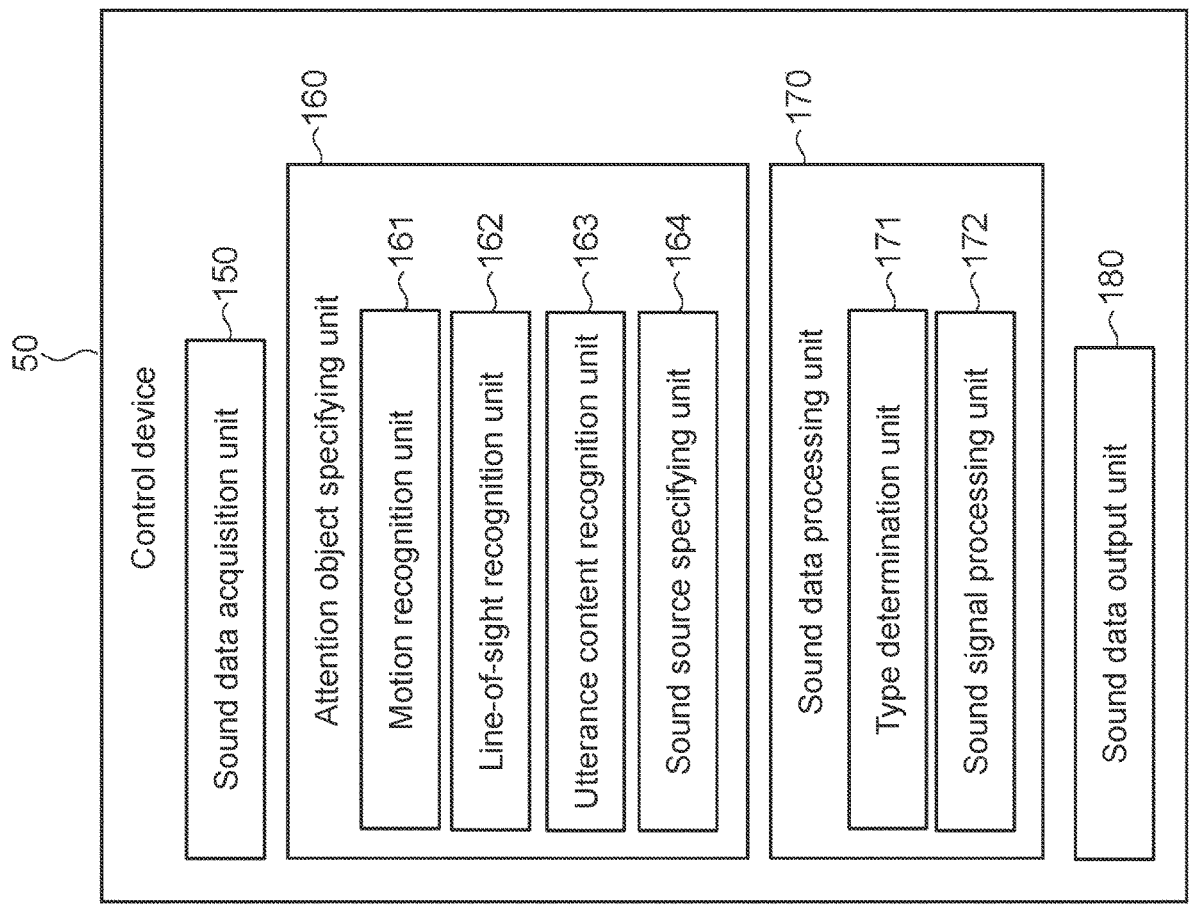
FIG. 2 is a block diagram illustrating functions of a control device illustrated in FIG. 1.

FIG. 2 is a block diagram illustrating functions of the control device 50 illustrated in FIG. 1. The functions of the control device 50 will be described with reference to FIG. 2. As illustrated in FIG. 2, the control device 50 includes a sound data acquisition unit 150, an attention object specifying unit 160, a sound data processing unit 170, and a sound data output unit 180. These blocks achieve respective functions, which will be described below, by the software established by the ROM.

The sound data acquisition unit 150 acquires the data about sounds from the sound collecting device 1. When the sound data acquisition unit 150 can acquire sound data from a system other than the sound output system 100, the sound data acquisition unit 150 acquires the sound data from that system. Examples of the system other than the sound output system 100 include a voice dialogue system, a notification system, a warning system, and a car audio system. In the following description, for descriptive purposes, the sound data acquired by the sound data acquisition unit 150 will also be referred to as first sound data. The following description will be made for an example of processing for one occupant, but when there is a plurality of occupants, that is, when there is a plurality of first sound data sets, the processing described below is performed for each first sound data set.

As described previously, the sound data output from the sound collecting device 1 includes information that allows an occupant to determine the direction of a sound source and the distance to the sound source. The sound data acquisition unit 150 uses the positional information of sound sources, which is stored in the database 3, to specify the position of a sound source for one or more types of sounds which the occupant hears. For example, when the first sound data includes the voice of another occupant, the sound data acquisition unit 150 determines that the sound source is an occupant and specifies the position of the occupant by referring to the positional information of sound sources.

Additionally or alternatively, when acquiring the sound data from a voice dialogue system or the like, for example, the sound data acquisition unit 150 determines that the sound source is a speaker and specifies the position of the speaker by referring to the positional information of sound sources. In this operation, the sound data acquisition unit 150 analyzes the first sound data and specifies the speaker which an occupant feels closest to as the sound source among all the speakers installed in the cabin of the vehicle.

The attention object specifying unit 160 specifies an attention object that is an object to which an occupant of the vehicle directs attention. In addition, the attention object specifying unit 160 specifies a sound source corresponding to the attention object. An object refers to a device or a person in the cabin of the vehicle.

As illustrated in FIG. 2, the attention object specifying unit 160 has a motion recognition unit 161, a line-of-sight recognition unit 162, and an utterance content recognition unit 163 as functional blocks for determining whether or not an occupant directs attention to an object. These blocks are blocks for recognizing the behavior of the occupant. The attention object specifying unit 160 further has a sound source specifying unit 164 as a functional block for specifying an attention object and a sound source of sound relating to the attention object.

First, the functional blocks for determining whether or not an occupant directs attention to an object will be described. The motion recognition unit 161 recognizes the motion of an occupant based on the captured image captured by the imaging device 2. For example, the motion recognition unit 161 recognizes the gesture of an occupant by executing image processing for analyzing the appearance of the occupant's hand on the captured image. Further, when the occupant's gesture is pointing by finger, the motion recognition unit 161 recognizes the position pointed by the finger or the direction pointed by the finger. In the following description, for descriptive purposes, the position pointed by the finger will also be referred to as a pointed position, and the direction pointed by the finger will also be referred to as a pointed direction.

It is assumed, for example, that feature points (e.g., the positional relationship of each finger and the like) in the gesture of a person pointing by finger are preliminarily set and stored in a storage medium such as a hard disk (HDD) or a ROM. In this case, the motion recognition unit 161 extracts the feature points of the hand from a portion of the captured image captured by the imaging device 2 in which the occupant's hand is captured. Then, the motion recognition unit 161 compares the extracted feature points with the feature points stored in the storage medium thereby to determine whether or not the gesture by the occupant corresponds to the gesture of pointing by finger. For example, when the number of the extracted feature points that match the feature points stored in the storage medium is a predetermined number or more, the motion recognition unit 161 determines that the gesture of the occupant is pointing by finger. On the other hand, when the number of the extracted feature points that match the feature points stored in the storage medium is less than the predetermined number, the motion recognition unit 161 determines that the gesture of the occupant is other than pointing by finger. The predetermined number refers to a threshold value for determining whether or not the gesture of an occupant is pointing by finger, and the threshold value is preliminarily determined. The above determination method is an example, and the motion recognition unit 161 can determine whether or not the gesture of an occupant is pointing by finger using a technique known at the time of filing the present application.

The line-of-sight recognition unit 162 recognizes the line of sight of an occupant based on the captured image captured by the imaging device 2. For example, the line-of-sight recognition unit 162 recognizes the line-of-sight direction of an occupant by executing image processing for analyzing the appearance of the occupant's eyes on the captured image. Further, when the occupant is gazing, the line-of-sight recognition unit 162 recognizes a gaze position at which the occupant is gazing or a gaze direction in which the occupant is gazing. The gaze position is a certain position in the cabin of the vehicle, and the gaze direction is a certain direction in the cabin of the vehicle. Here and hereinafter, for descriptive purposes, the position at which an occupant is gazing will also be referred to as a gaze position, and the direction in which an occupant is gazing will also be referred to as a gaze direction.

For example, the line-of-sight recognition unit 162 continuously monitors a portion of the captured image captured by the imaging device 2 in which the occupant's eyes are captured. The line-of-sight recognition unit 162 determines that the occupant is gazing, for example, when the line of sight of the occupant does not move for a certain period of time or more and points in the same direction. On the other hand, when the line of sight of the occupant moves within the certain period of time, the line-of-sight recognition unit 162 determines that the occupant is not gazing. The certain period of time is a threshold value for determining whether or not an occupant is gazing, and the threshold value is preliminarily determined. The above determination method is an example, and the line-of-sight recognition unit 162 can determine whether or not an occupant is gazing using a technique known at the time of filing the present application.

The utterance content recognition unit 163 acquires the voice of an occupant from a device that collects the sounds and voices in the cabin of the vehicle, and recognizes the utterance content based on the voice of the occupant. The device that collects the voices of occupants may be the sound collecting device 1 or may otherwise be another sound collecting device different from the sound collecting device 1. For example, the utterance content recognition unit 163 recognizes the utterance content of an occupant by executing a voice recognition process for recognizing the voice of the occupant on the sound data corresponding to the voice of the occupant. The utterance content recognition unit 163 can recognize the utterance content of an occupant using a voice recognition technique known at the time of filing the present application.

The attention object specifying unit 160 uses at least one of the results obtained by the motion recognition unit 161, the line-of-sight recognition unit 162, and the utterance content recognition unit 163 to determine whether or not the occupant is directing attention to an object. When making a determination using a plurality of results, the attention object specifying unit 160 may make a determination using a prioritizing process and/or a weighting process for the results of the blocks, etc.

For example, when the motion recognition unit 161 determines that the gesture of an occupant is pointing by finger, the attention object specifying unit 160 determines that the occupant is directing attention to an object. Additionally or alternatively, for example, when the line-of-sight recognition unit 162 determines that the occupant is gazing, the attention object specifying unit 160 determines that the occupant is directing attention to an object. Additionally or alternatively, for example, when the utterance content recognition unit 163 determines that the voice of the occupant includes a specific keyword or a specific key phrase, the attention object specifying unit 160 determines that the occupant is directing attention to an object. The specific keyword or specific key phrase refers to a keyword or key phrase for determining whether or not the occupant is directing attention to an object, and the keyword or key phrase is preliminarily determined. Examples of the specific keyword include words relating to equipment provided in the vehicle, such as "navigation voice." Examples of the specific key phrase include phrases expressing a desire, such as "let me hear X" or "want to see Y."

The description will then be directed to each functional block for specifying an attention object and a sound source corresponding to the attention object. The sound source specifying unit 164 specifies an attention object and a sound source corresponding to the attention object based on at least one of the results obtained by the motion recognition unit 161, the line-of-sight recognition unit 162, and the utterance content recognition unit 163 and the positional information of sound sources or the in-vehicle space information stored in the database 3. When specifying an attention object and a sound source corresponding to the attention object using a plurality of results, the attention object specifying unit 160 may use a prioritizing process and/or a weighting process for the results of the blocks, etc.

The sound source specifying unit 164 specifies an attention object and a sound source corresponding to the attention object based on the pointed position or pointed direction by the occupant and the positional information of sound sources or the in-vehicle space information. Additionally or alternatively, the sound source specifying unit 164 specifies an attention object and a sound source corresponding to the attention object based on the gaze position or gaze direction of the occupant and the positional information of sound sources or the in-vehicle space information. Additionally or alternatively, the sound source specifying unit 164 specifies an attention object and a sound source corresponding to the attention object based on the utterance content of the occupant and the positional information of sound sources or the in-vehicle space information.

Figure 3:
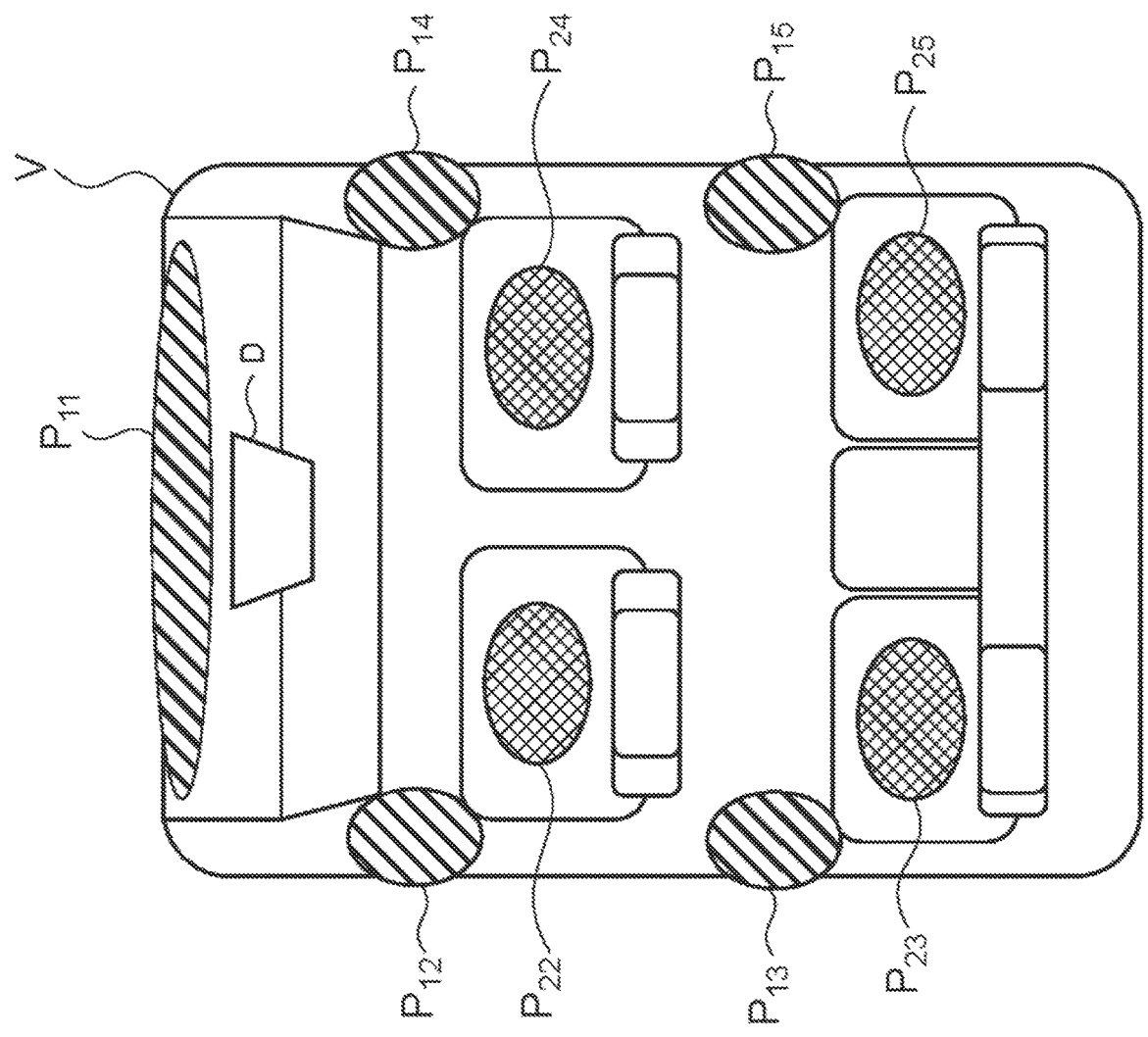
FIG. 3 illustrates an example of positional information of sound sources in the cabin of a vehicle.

A method of specifying an attention object and a sound source corresponding to the attention object will be described with reference to FIGS. 3 to 6. FIG. 3 illustrates an example of the positional information of sound sources in the cabin of a vehicle V, which is stored in the database 3. FIG. 3 illustrates a plan view representing the cabin of the vehicle V. The vehicle V has two seats in the front and two seats in the rear. In FIG. 3, the traveling direction of the vehicle V directs upward in the drawing. In FIGS. 3, $P_{11}$ to $P_{15}$ represent the positions at which the speakers are arranged, and $P_{22}$ to $P_{25}$ represent the positions of the heads of occupants when sitting in the seats. $P_{22}$ to $P_{25}$ are illustrated so as to be superposed on the seats. In FIG. 3, D represents a display embedded in the instrument panel. The display D displays a menu screen provided by a navigation system, guidance information to a destination, etc. The navigation system is a system included in the voice dialogue system.

Figure 4:
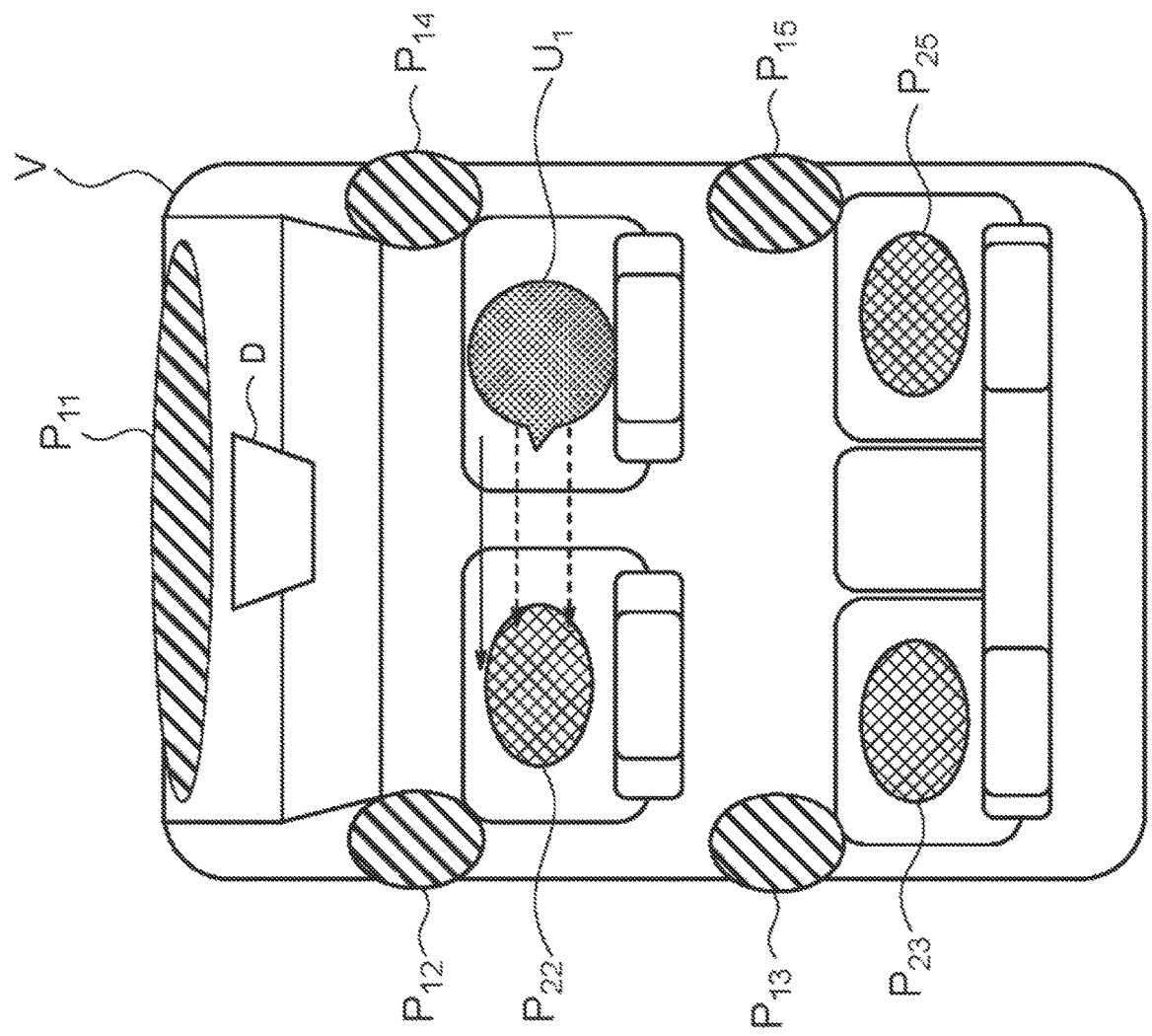
FIG. 4 is a diagram for describing a method of specifying an attention object and a sound source corresponding to the attention object using the positional information of sound sources.

FIG. 4 is a diagram for describing a method of specifying an attention object and a sound source corresponding to the attention object using the positional information of sound sources. $P_{11}$ to $P_{15}$, $P_{22}$, $P_{23}$, and $P_{25}$ illustrated in FIG. 4 correspond to $P_{11}$ to $P_{15}$, $P_{22}$, $P_{23}$, and $P_{25}$ illustrated in FIG. 3. In FIG. 4, $U_1$ represents an occupant sitting in the driver seat. The occupant $U_1$ is facing the left side with respect to the traveling direction of the vehicle V. In FIG. 4, the line of sight of the occupant $U_1$ is indicated by a dotted arrow. The occupant $U_1$ is pointing to the left side by finger with respect to the traveling direction of the vehicle V. In FIG. 4, the pointed direction by the occupant $U_1$ is indicated by a solid arrow. In the example of FIG. 4, it is assumed that the vehicle V is stopped or parked at a given place or the vehicle V is traveling in an automated or autonomous manner by a so-called automated driving function, and even when the occupant $U_1$ is facing the left side with respect to the traveling direction, the driving of the vehicle V is not affected. For descriptive purposes, although not illustrated, an occupant $U_2$ is sitting in the front passenger seat of the vehicle V in FIG. 4, and the occupant $U_1$ and the occupant $U_2$ have a dialogue with each other.

In the example of FIG. 4, the sound source specifying unit 164 compares the pointed position by the occupant $U_1$ with the positions of sound sources (position $P_{11}$ to position $P_{15}$, position $P_{22}$, and position $P_{25}$). When specifying that the pointed position by the occupant $U_1$ is near the position $P_{22}$, the sound source specifying unit 164 specifies the occupant $U_2$ as the attention object. In this operation, the sound source specifying unit 164 specifies that the sound which the occupant $U_1$ is trying to listen to while directing attention is the voice of the occupant $U_2$. Further, the sound source specifying unit 164 specifies the occupant $U_2$ as the sound source corresponding to the attention object because the occupant $U_2$ produces the sound which the occupant $U_1$ is trying to listen to while directing attention. Alternatively, in the above specifying method, the sound source specifying unit 164 can replace the pointed position with the pointed direction, the gaze position, or the gaze direction and then specify an attention object and a sound source corresponding to the attention object in the same method as the specifying method using the pointed position.

Figure 5:
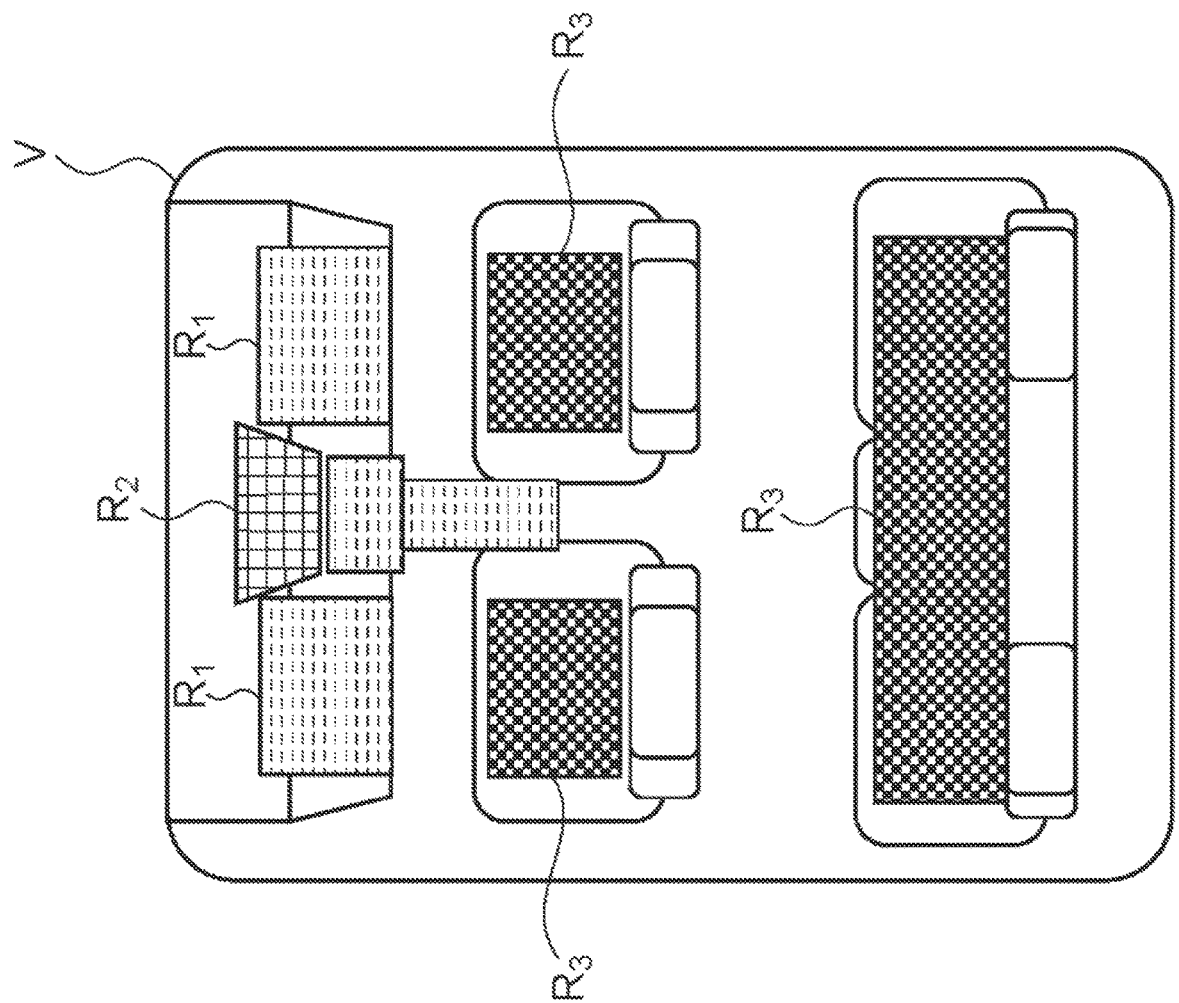
FIG. 5 illustrates an example of in-vehicle space information.

FIG. 5 illustrates an example of the in-vehicle space information stored in the database 3. FIG. 5 illustrates a plan view representing the cabin of the vehicle V as in FIGS. 3 and 4.

In FIG. 5, each $R_1$ represents a region relating to the notification sound. Regions relating to the notification sound include, for example, a speedometer, a fuel gauge, a water temperature gauge, an odometer, etc. which are located in front of the driver seat. Regions relating to the notification sound may also include the center console, the shift lever, and the operation unit of an air conditioner, which are located between the driver seat and the front passenger seat, and may further include a storage space so-called a dashboard, which is located in front of the front passenger seat. The regions $R_1$ are associated with the speakers arranged at the positions $P_{11}$ to $P_{15}$ in FIG. 3.

In FIG. 5, $R_2$ represents a region relating to the voice dialogue between the navigation system and an occupant. Regions relating to the voice dialogue include a display for displaying a menu screen or the like of the navigation system. In FIG. 5, $R_2$ corresponds to a display D illustrated in FIG. 3. The region $R_2$ is associated with the speakers arranged at the positions $P_{11}$ to $P_{15}$ in FIG. 3.

In FIG. 5, each $R_3$ indicates a region relating to the utterance of an occupant. Regions relating to the utterance of an occupant include seats in which occupants sit. The regions $R_3$ are associated with occupants sitting in $P_{22}$ to $P_{25}$ in FIG. 3.

Figure 6:
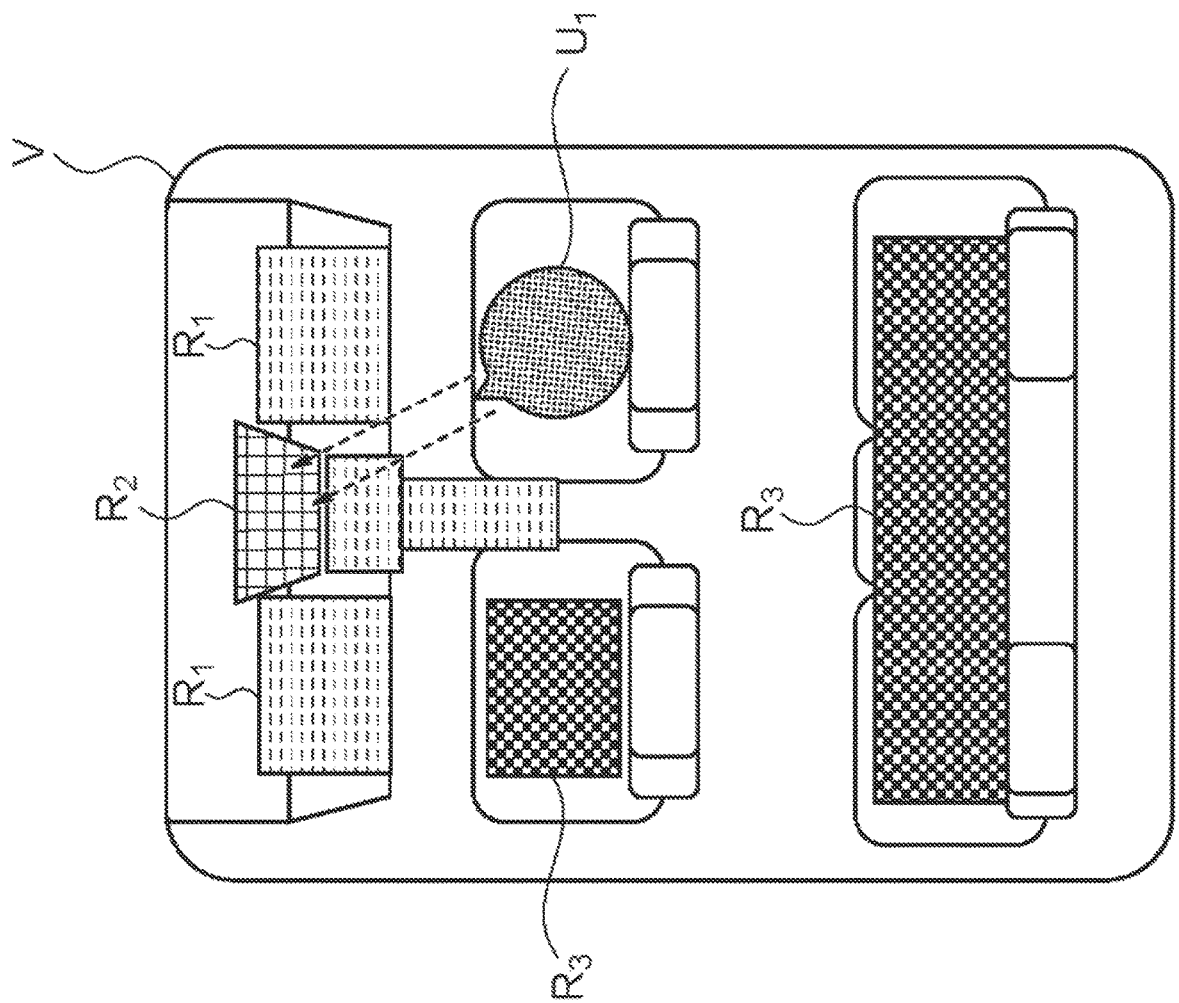
FIG. 6 is a diagram for describing a method of specifying an attention object and a sound source corresponding to the attention object using the in-vehicle space information.

FIG. 6 is a diagram for describing a method of specifying an attention object and a sound source corresponding to the attention object using the in-vehicle space information. $R_1$ to $R_3$ illustrated in FIG. 6 correspond to $R_1$ to $R_3$ illustrated in FIG. 5. In FIG. 6, $U_1$ represents an occupant sitting in the driver seat. The occupant $U_1$ is looking at the display D (see FIG. 3). In FIG. 6, the line of sight of the occupant $U_1$ is indicated by a dotted arrow. The scene illustrated in the example of FIG. 6 is a scene in which the driving of the vehicle V is not affected even when the occupant $U_1$ is looking at the display D, as in the scene illustrated in the example of FIG. 4.

In the example of FIG. 6, the sound source specifying unit 164 compares the gaze position of the occupant $U_1$ with the regions (region $R_1$ to region $R_3$). When specifying that the gaze position of the occupant $U_1$ is near the region $R_2$, the sound source specifying unit 164 specifies the display D as the attention object. In this operation, the sound source specifying unit 164 specifies that the sound which the occupant $U_1$ is trying to listen to while directing attention is the output sound from speakers from the correspondence relationship between the region $R_2$ and the speakers. Further, the sound source specifying unit 164 specifies these speakers as the sound sources corresponding to the attention object because the sound which the occupant $U_2$ is trying to listen to while directing attention is output from these speakers. The specified speakers are a plurality of speakers arranged at positions $P_{11}$ to $P_{15}$ in FIG. 3.

In addition, the sound source specifying unit 164 specifies the speaker which an occupant feels closest to as the sound source among the plurality of speakers. The sound source specifying unit 164 analyzes the first sound data thereby to specify the speaker which the occupant $U_1$ feels closest to among the plurality of speakers and also specify the position of the speaker. In the example of FIG. 6, for example, the sound source specifying unit 164 specifies as a result of analyzing the first sound data that the speaker which the occupant $U_1$ feels closest to is the speaker arranged at the position $P_{14}$ illustrated in FIG. 3. Thus, in the present embodiment, when there is a plurality of sound sources corresponding to the attention object, the sound source which an occupant feels closest to is specified. The sound output from the sound source is emphasized by the sound data processing unit 170, which will be described below, and therefore the emphasized sound can be effectively conveyed to the occupant.

Referring again to FIG. 2, the functions of the control device 50 illustrated in FIG. 1 will be further described. The sound data processing unit 170 executes a process of emphasizing a specific sound more than other sounds for the data about sounds collected by the sound collecting device 1 and generates data about a sound whose sound image is localized in the cabin of the vehicle. For descriptive purposes, the data about a sound generated by the sound data processing unit 170 will also be referred to as second sound data.

In the present embodiment, the sound data processing unit 170 generates the second sound data in which the sound relating to an attention object is emphasized in comparison with the first sound data acquired by the sound data acquisition unit 150. The attention object refers to an object to which an occupant directs attention, and the object is specified by the attention object specifying unit 160. In other words, when comparing the first sound data with the second sound data, the number of sound sources of the sound heard by an occupant and the position at which the sound image is localized with reference to the occupant are the same, but in the second sound data, the volume or intensity of the sound relating to the attention object is relatively larger than the volume or intensity of other sounds in comparison with the first sound data.

The sound relating to an attention object refers to a sound output from the attention object, a sound output from a related object that is associated with the attention object and different from the attention object, and both the sounds. In other words, the sound relating to an attention object includes at least one of the sound output from the attention object and the sound output from the related object.

For example, when a conversation is held between two occupants and the attention object for one occupant is the other occupant, the sound source corresponding to the attention object is also an occupant, as described previously. In this case, the sound data processing unit 170 adopts the voice from the other occupant as the target of an emphasis process.

When the attention object for one occupant is the screen of route guidance provided by the navigation system, for example, the attention object is the display and the sound source corresponding to the attention object is a speaker as described previously. In the present embodiment, when no sound is output from the attention object, an object associated with the attention object and outputting the sound is recognized as the related object. In the case of the above example, the sound data processing unit 170 recognizes the speaker as the related object and adopts the output sound from the speaker as the target of the emphasis process.

When a conversation is held among three or more occupants and the attention object for one occupant is a specific occupant among a plurality of occupants, for example, the sound source corresponding to the attention object is the specific occupant. In the present embodiment, when an object in the same category as the attention object is specified, the specified object is recognized as the related object. In the case of the above example, the sound data processing unit 170 recognizes a plurality of occupants other than the specific occupant, that is, other occupants as the related objects. Then, the sound data processing unit 170 adopts not only the voice of the specific occupant but also the voices of other occupants as the targets of the emphasis process.

As illustrated in FIG. 2, the sound data processing unit 170 has a type determination unit 171 and a sound signal processing unit 172.

The type determination unit 171 determines whether or not the type of the sound relating to the attention object as the target of the emphasis process is a type that can be controlled via a system different from the sound output system 100. Examples of the system different from the sound output system 100 include a voice dialogue system, a notification system, a warning system, and a car audio system. Targets controlled by these systems include, for example, the volume and intensity of sound.

For example, when the sound relating to an attention object is a voice programmed by the voice dialogue system, the type determination unit 171 determines the type of the sound relating to the attention object as a type that can be controlled via the system. In other words, the type determination unit 171 determines that the data about the sound relating to the attention object can be acquired from a system different from the sound output system 100. The sound signal processing unit 172 acquires the data about the sound relating to the attention object from that system and executes the process of superposing the acquired data on the first sound data thereby to generate the second sound data. In the following description, for descriptive purposes, the data about the sound relating to an attention object will also be referred to as third sound data. When generating the second sound data, the sound signal processing unit 172 may perform a process of increasing the volume of the sound or a process of enhancing the intensity of the sound for the acquired third sound data and then superpose the processed sound on the first sound data.

The above method of emphasizing the sound relating to an attention object as compared with other sounds is an example, and the sound signal processing unit 172 can emphasize the sound relating to an attention object as compared with other sounds using a sound emphasizing process known at the time of filing the present application. For example, when a device worn by an occupant, such as headphones, is used as the output device 4, the sound signal processing unit 172 may execute a process of increasing the volume of the sound relating to an attention object as compared with other sounds. In this case, the sound signal processing unit 172 uses the volume-adjusted sound data as the second sound data.

When the sound relating to an attention object is the voice of an occupant, for example, the type determination unit 171 determines that the type of the sound relating to the attention object is an uncontrollable type via the system. In other words, the type determination unit 171 determines that the data about the sound relating to the attention object cannot be acquired from a given system. The sound signal processing unit 172 extracts the data about the sound relating to the attention object from the first sound data and executes the emphasis process on the extracted data about the sound to generate the second sound data.

The sound data output unit 180 outputs the second sound data generated by the sound data processing unit 170 to the output device 4.

Figure 7:
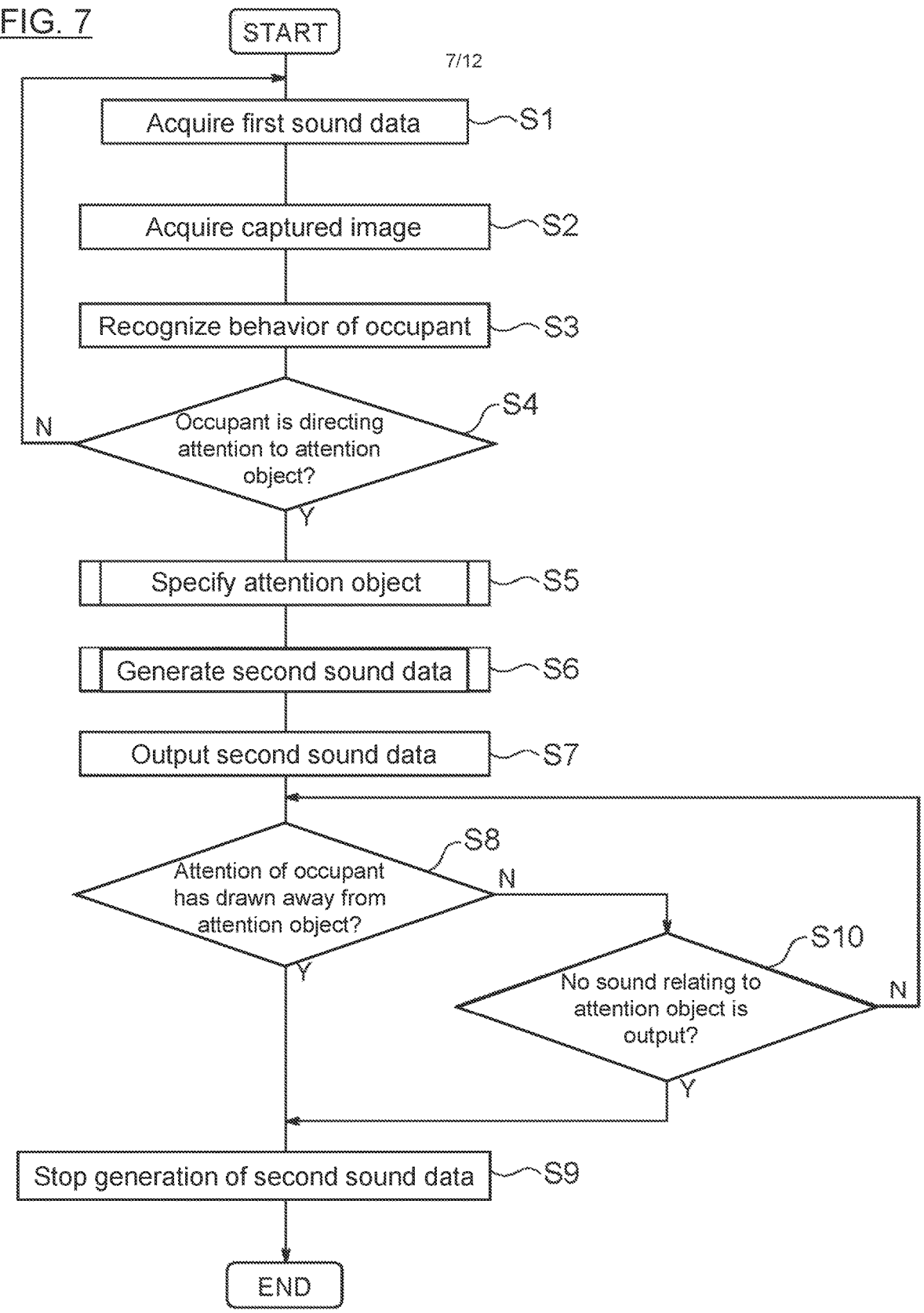
FIG. 7 is a flowchart illustrating a process executed by the sound data processing device.

The process executed by the sound data processing device 5 in the sound output system 100 will then be described with reference to FIGS. 7 and 8. FIG. 7 is a flowchart illustrating a process executed by the sound data processing device 5 according to the present embodiment.

In step S1, the sound data processing device 5 acquires the first sound data from the sound collecting device 1. The first sound data includes information that allows an occupant to determine the direction of a sound source and the distance to the sound source. In step S2, the sound data processing device 5 acquires from the imaging device 2 a captured image in which the appearance of the cabin of the vehicle is captured.

In step S3, the sound data processing device 5 recognizes the behavior of the occupant based on the first sound data acquired in step S1 or the captured image acquired in step S2. For example, the sound data processing device 5 determines, based on the captured image, whether or not the occupant is pointing by finger. When determining that the occupant is pointing by finger, the sound data processing device 5 specifies, based on the captured image, a pointed position or a pointed direction which the occupant points by finger. Additionally or alternatively, the sound data processing device 5 may determine, based on the captured image, whether or not the occupant is gazing, and when determining that the occupant is gazing, the sound data processing device 5 may specify a gaze position at which the occupant is gazing or a gaze direction in which the occupant is gazing. Additionally or alternatively, the sound data processing device 5 may recognize the utterance content of the occupant based on the first sound data. By performing one or more of these processes, the sound data processing device 5 recognizes the behavior of the occupant. The above processes in steps S1 to S3 are continuously performed in steps S5 and subsequent steps, which will be described later.

In step S4, the sound data processing device 5 determines, based on the behavior of the occupant recognized in step S3, whether or not the occupant is directing attention to an object. Taking the pointing by finger as an example, when determining in step S4 that the occupant is pointing by finger, the sound data processing device 5 determines that the occupant is directing attention to the object. In this case, the process proceeds to step S5.

On the other hand, when determining in step S4 that the occupant is not pointing by finger, the sound data processing device 5 determines that the occupant is not directing attention to an object. In this case, the process returns to step S1. The above determination method is an example, and the sound data processing device 5 can determine, based on other determination results obtained in step S3 and the combination of the determination results, whether or not the occupant is directing attention to an object.

When a determination is made in step S4 that the occupant is directing attention to an object, the process proceeds to step S5. When proceeding to step S5, the process proceeds to the subroutine illustrated in FIG. 8, in which the sound data processing device 5 performs processing such as specifying the attention object. FIG. 8 illustrates a subroutine of step S5 illustrated in FIG. 7.

In step S51, the sound data processing device 5 acquires the positional information of sound sources in the cabin of the vehicle from the database 3. Examples of the positional information of sound sources include a plan view illustrating the cabin of the vehicle as illustrated in FIG. 3. In step S52, the sound data processing device 5 acquires the in-vehicle space information from the database 3. Examples of the in-vehicle space information include a plan view illustrating the cabin of the vehicle as illustrated in FIG. 5. The positional information of the sound sources and the in-vehicle space information may be any information that represents the cabin of the vehicle, and its form is not limited to the plan view.

In step S53, the sound data processing device 5 specifies, based on the positional information of sound sources acquired in step S51 or the in-vehicle space information acquired in step S52, an attention object that is an object to which the occupant directs attention.

For example, when the occupant sitting in the driver seat points his/her finger toward the front passenger seat side as illustrated in FIG. 4, the sound data processing device 5 specifies, based on the pointed position or pointed direction by the occupant and the positional information of the sound source, an occupant sitting in the front passenger seat as the attention object. In addition, the sound data processing device 5 specifies that occupant as the sound source corresponding to the attention object.

As illustrated in FIG. 6, when the occupant sitting in the driver seat is gazing at the display, for example, the sound data processing device 5 specifies the display as the attention object based on the gaze position or gaze direction of the occupant and the in-vehicle space information. When the sound source associated with the region $R_2$ illustrated in FIG. 6 is a speaker, the sound data processing device 5 specifies the associated speaker as a sound source corresponding to the attention object.

Figure 9:
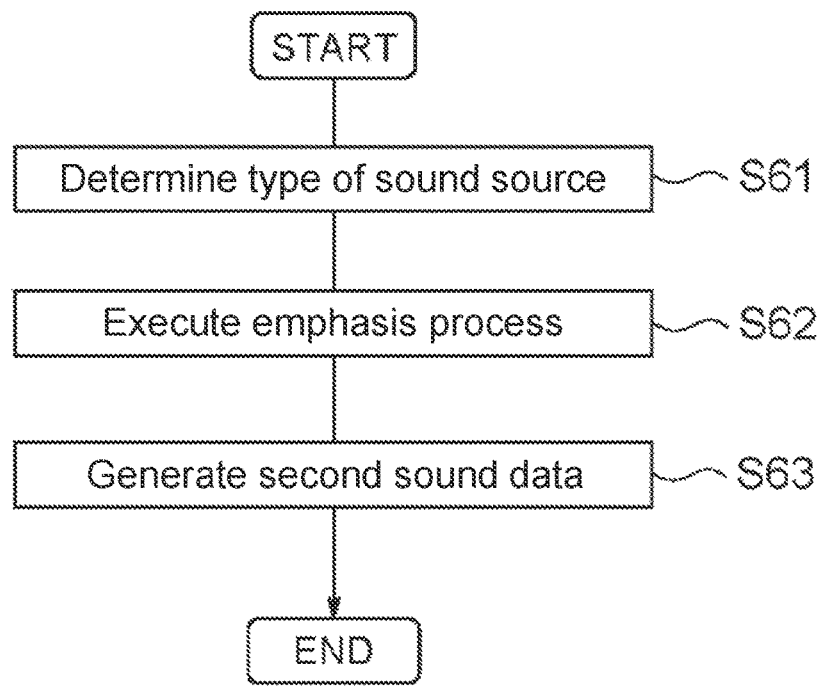
FIG. 9 illustrates a subroutine of step S6 illustrated in FIG. 7.

When the process in step S53 is completed, the process proceeds to step S6 illustrated in FIG. 7. In step S6, the second sound data generation process and the like are performed. FIG. 9 illustrates a subroutine of step S6 illustrated in FIG. 7.

Figure 8:
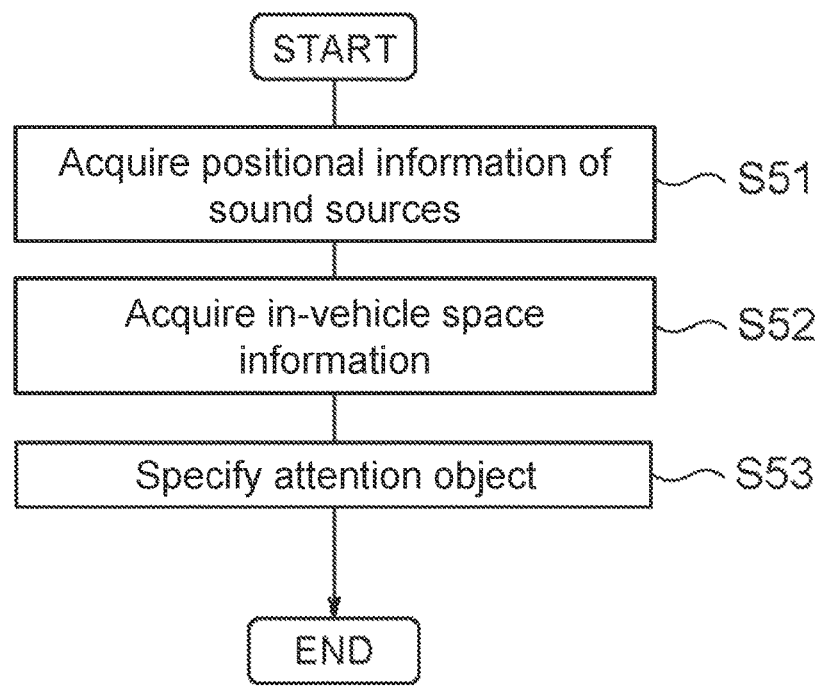
FIG. 8 illustrates a subroutine of step S5 illustrated in FIG. 7.

In step S61, the sound data processing device 5 determines whether or not the type of the sound source corresponding to the attention object specified in step S53 illustrated in FIG. 8 is a type that can be controlled via a system different from the sound output system 100. For example, when the third sound data which is the data of the sound relating to the attention object can be acquired from a system different from the sound output system 100, the sound data processing device 5 determines that the type of the sound source corresponding to the attention object is a type that can be controlled via another system. Sounds corresponding to such a type include, for example, a voice that is programmed by a voice dialogue system, a notification sound that is set by a notification system, a warning sound that is set by a warning system, an audio sound that is set by a car audio system, etc.

On the other hand, when the third sound data can be acquired only from the sound collecting device 1 included in the sound output system 100, the sound data processing device 5 determines that the type of the sound source corresponding to the attention object is a type that cannot be controlled via another system. Examples of such a type of sound include the voice of an occupant.

In step S62, the sound data processing device 5 executes an emphasis process for emphasizing the sound relating to the attention object in comparison with other sounds in accordance with the determination result in step S61. For example, when the voice programmed by the voice dialogue system is a sound relating to the attention object, the sound data processing device 5 acquires the third sound data from the voice dialogue system and superposes the third sound data on the first sound data acquired in step S1. When the voice of an occupant is a sound relating to the attention object, the sound data processing device 5 extracts the third sound data from the first sound data acquired in step S1 and executes the emphasis process for the extracted third sound data.

In step S63, the sound data processing device 5 generates, based on the execution result in step S62, the second sound data in which the sound relating to the attention object is emphasized. When the process in step S63 is completed, the process proceeds to step S7 illustrated in FIG. 7.

In step S7, the sound data processing device 5 outputs the second sound data generated in step S6 to the output device 4. This step is a step indicating that the output of the second sound data from the sound data processing device 5 to the output device 4 has started.

In step S8, the sound data processing device 5 determines whether or not the attention of the occupant has drawn away from the attention object. When determining from the behavior recognition result of the occupant in step S3 that the attention of the occupant is not directed to the attention object specified in step S5, the sound data processing device 5 determines that the attention of the occupant has drawn away from the attention object. In this case, the process proceeds to step S9. In step S9, the sound data processing device 5 stops the process of generating the second sound data and concludes the process illustrated in the flowchart of FIG. 7.

For example, when there is no attention object at or near the pointed position by the occupant, the sound data processing device 5 determines, based on the pointed position by the occupant and the positional information of the sound source, that the attention of the occupant has drawn away from the attention object. The above determination method is an example. For example, when a gesture for determining that the attention of the occupant has drawn away from the attention object is preliminarily set and the occupant is recognized to perform the gesture, the sound data processing device 5 may determine that the attention of the occupant has drawn away from the attention object.

On the other hand, when determining that the attention of the occupant is directed to the attention object specified in step S5, the sound data processing device 5 determines that the attention of the occupant does not draw away from the attention object. In this case, the process proceeds to step S10. For example, when there is an attention object at or near the pointed position by the occupant, the sound data processing device 5 determines, based on the pointed position by the occupant and the positional information of the sound source, that the attention of the occupant does not draw away from the attention object. The above determination method is an example. For example, when a gesture for determining that the attention of the occupant has drawn away from the attention object is preliminarily set and the occupant is recognized not to perform the gesture, the sound data processing device 5 may determine that the attention of the occupant does not draw away from the attention object.

When a determination is made in step S8 that the attention of the occupant does not draw away from the attention object, the process proceeds to step S10. In step S10, the sound data processing device 5 determines whether or not a sound relating to the attention object is output. For example, when the output from the sound source corresponding to the attention object cannot be confirmed for a predetermined time, the sound data processing device 5 determines that the sound relating to the attention object is not output. In this case, the process proceeds to step S9. In step S9, the sound data processing device 5 stops the process of generating the second sound data and concludes the process illustrated in the flowchart of FIG. 7. The predetermined time refers to a time for determining whether or not the sound relating to the attention object is output, and the time is preliminarily set.

On the other hand, for example, when the output from the sound source corresponding to the attention object can be confirmed within the predetermined time, the sound data processing device 5 determines that the sound relating to the attention object is output. In this case, the process returns to step S8.

As described above, in the present embodiment, the sound data processing device 5 includes the sound data acquisition unit 150 configured to acquire the first sound data that is data about a sound whose sound image is localized in the cabin of the vehicle, the attention object specifying unit 160 configured to specify an attention object that is an object to which an occupant of the vehicle directs attention, a sound data processing unit 170 configured to generate the second sound data that is data about the sound for which a sound relating to the attention object is emphasized in comparison with the first sound data, and the sound data output unit 180 configured to output the second sound data to the output device 4. Through this configuration, the sound which the occupant of the vehicle tries to listen to carefully is reproduced in a state of being emphasized, and the occupant can easily listen to the sound which the occupant tries to listen to carefully.

Moreover, in the present embodiment, the attention object specifying unit 160 acquires a captured image of the occupant from the imaging device 2, recognizes the pointed position or pointed direction by the occupant based on the acquired captured image, acquires the positional information of a sound source or the in-vehicle space information from the database 3, and specifies the attention object based on the recognized pointed position or pointed direction and the positional information of the sound source or the in-vehicle space information. The occupant can convey the attention object to the sound data processing device 5 by an intuitive and efficient method, such as using a gesture. The sound data processing device 5 can specify the attention object with a high degree of accuracy.

Furthermore, in the present embodiment, the attention object specifying unit 160 recognizes the gaze position or gaze direction of the occupant based on the captured image acquired from the imaging device 2, acquires the positional information of a sound source or the in-vehicle space information from the database 3, and specifies the attention object based on the recognized gaze position or gaze direction and the positional information of the sound source or the in-vehicle space information. The occupant can convey the attention object to the sound data processing device 5 by an intuitive and efficient method, such as using a line of sight. The sound data processing device 5 can specify the attention object with a high degree of accuracy.

In addition, in the present embodiment, the attention object specifying unit 160 acquires the voice of the occupant from the sound collecting device 1 or other sound collecting device, recognizes the utterance content of the occupant based on the acquired voice of the occupant, and specifies the attention object based on the recognized utterance content. The occupant can convey the attention object to the sound data processing device 5 by an intuitive and efficient method, such as using the utterance content. The sound data processing device 5 can specify the attention object with a high degree of accuracy.

Moreover, in the present embodiment, the sound relating to the attention object is a sound that is output from the attention object. For example, when the attention object is another occupant, the emphasized sound comes from the direction in which the occupant directs attention, and therefore the occupant can easily listen to the sound which the occupant wants to listen to while directing attention.

Furthermore, in the present embodiment, the sound relating to the attention object is a sound output from a related object that is associated with the attention object and different from the attention object. For example, in a case in which the attention object is a voice guidance of the navigation system, the voice guidance corresponding to the information displayed on the display is emphasized regardless of whether the occupant directs attention to the display; therefore, even when the occupant directs attention to an object that does not output a sound, the occupant can easily listen to the sound relating to the object.

In addition, in the present embodiment, the sound relating to the attention object is each of a sound output from the attention object and a sound output from a related object that is associated with the attention object and different from the attention object. For example, in a scene in which a conversation is being held among three or more occupants, when the attention object is one of the plurality of occupants and the related object is another occupant, not only the sound of a target which the occupant directs attention but also the sound relating to the target is emphasized. Even when the occupant does not direct attention, the emphasized sound comes from the target relating to the target to which the occupant directs attention. It is possible to provide the sound output system 100 which is highly convenient for the occupant.

Moreover, in the present embodiment, when the third sound data that is data about the sound relating to the attention object can be acquired from a system different from the sound output system 100, the sound data processing unit 170 executes a process of superposing the third sound data on the first sound data to generate the second sound data. For example, when a target whose volume and intensity of sound can be directly controlled, such as a voice guidance provided by the navigation system, is the target of the emphasis process, a simple method can be adopted to emphasize the sound which the occupant wants to listen to carefully.

Furthermore, in the present embodiment, when the third sound data cannot be acquired from a system different from the sound output system 100, the sound data processing unit 170 executes a sound emphasizing process for the third sound data included in the first sound data to generate the second sound data. For example, even for a target whose volume and intensity of sound cannot be directly controlled, such as the voice of an occupant, only such a target can be emphasized. Regardless of the target of the emphasis process, the sound which the occupant wants to listen to carefully can be emphasized.

In addition, in the present embodiment, the sound data acquisition unit 150 acquires the first sound data from the sound collecting device 1 that performs binaural recording of a sound generated in the cabin of the vehicle. Through this operation, the first sound data includes information that allows the occupant to determine the direction of the sound source and the distance to the sound source. After performing the process of emphasizing the sound relating to the attention object, the sound whose sound image is localized can be conveyed to the occupant without performing a sound image localization process on the sound. The complicated process such as a sound image localization process can be omitted, and the calculation load of the sound data acquisition unit 150 can be reduced. Moreover, the sound source in the cabin of the vehicle and its position can be easily specified from the information that allows the occupant to determine the position of the sound source and the distance to the sound source. Furthermore, it is possible to reproduce the sound as if it is captured by the right and left ears of the occupant.

Moreover, in the present embodiment, the attention object specifying unit 160 specifies the attention object and then determines whether or not the occupant is directing attention to the attention object. When the object specifying unit 160 determines that attention of the occupant is not directed to the attention object, the sound data processing unit 170 stops generation of the second sound data. This can prevent the sound relating to the attention object from being emphasized even though the attention of the occupant is not directed to the object, and the occupant can be prevented from being given uncomfortable feeling. In other words, it is possible to emphasize the sound which the occupant wants to listen to carefully in an appropriate scene in which the attention of the occupant is directed to the object.

Second Embodiment

The sound data processing device 5 according to the second embodiment will then be described. The present embodiment has the same configuration as that of the above-described first embodiment except that the sound collecting device 1 and output device 4 illustrated in FIG. 1 are provided in a head-mounted display type device, an icon so-called an avatar is included as the attention object and the sound source corresponding to the attention object, and a part of the functions of the sound data processing device 5 is different. Therefore, for the same configuration as that of the first embodiment, the description in the first embodiment will be borrowed herein.

In the sound output system 100 according to the present embodiment, a head-mounted display type device is used. The head-mounted display type device is equipped with an augment reality (AR) technique. An icon (also called an avatar) is displayed on the display of the head-mounted display type device. The occupant wearing this device can visually recognize an icon (also called an avatar) through the display and can have a dialogue with the icon. In the following description, such a device will also be simply referred to as a head-mounted display. In the present embodiment, objects include not only a device or a person in the cabin of the vehicle but also an icon presented to an occupant through the head-mounted display.

When the sound collecting device 1 and the output device 4 are integrally provided as the head-mounted display as in the present embodiment, examples of the sound collecting device 1 and the output device 4 include, for example, headphones capable of binaural recording.

Examples of scenes in which an occupant has a dialogue with an icon via the head-mounted display in the cabin of the vehicle include a scene in which, for example, a dialogue is held with a person located outside the vehicle. It suffices that a remote place is outside the vehicle and the remote place is not particularly limited. In this scene, when the occupant sitting in the driver seat looks at the front passenger seat through the display, an icon corresponding to the person in a remote place is displayed at a position corresponding to the front passenger seat. In addition, the voice of the person at the remote place is output from the headphones.

Figure 10:
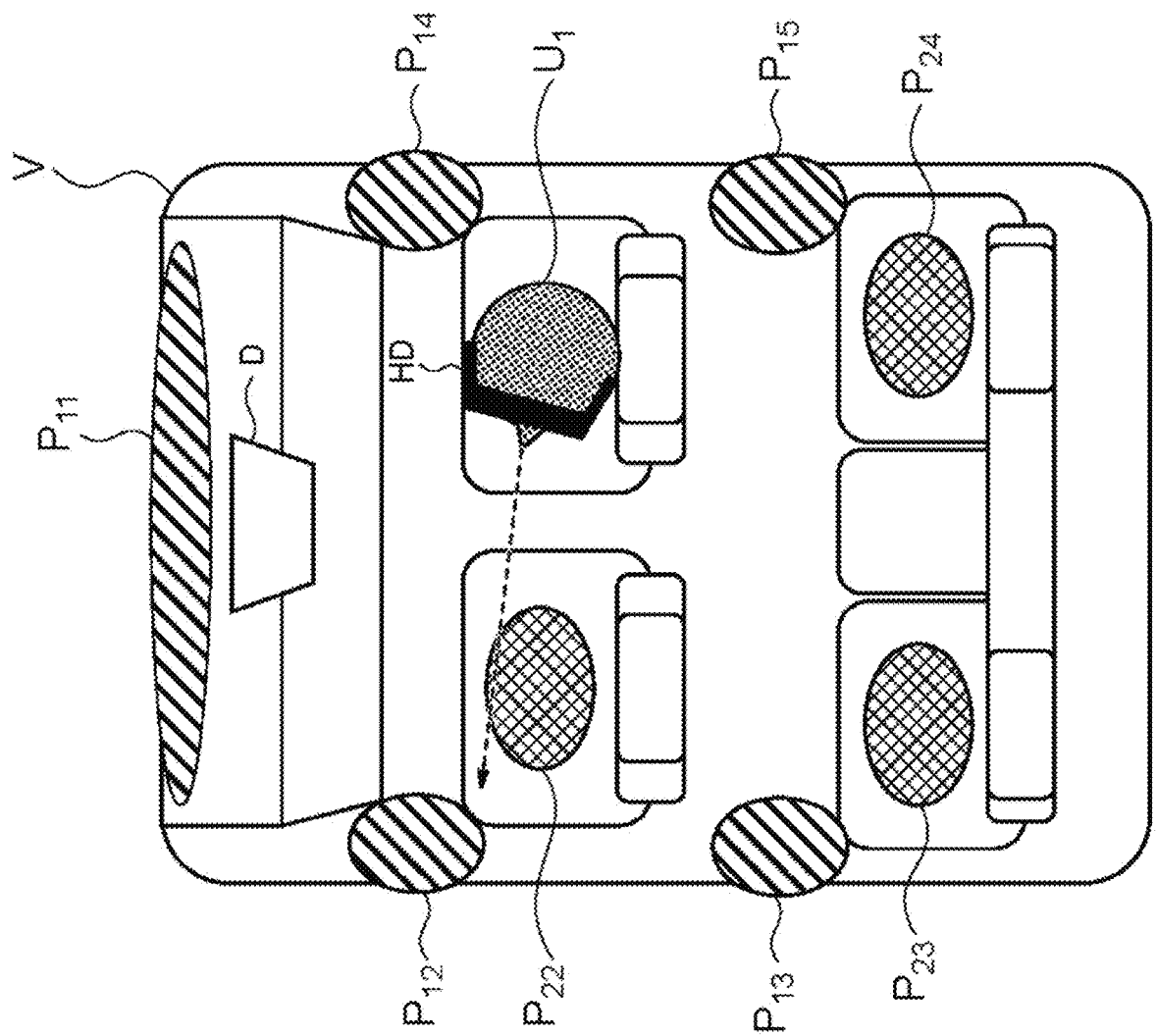
FIG. 10 illustrates an example of a scene in which an occupant wearing a head-mounted display has a dialogue with an icon.
Figure 11:
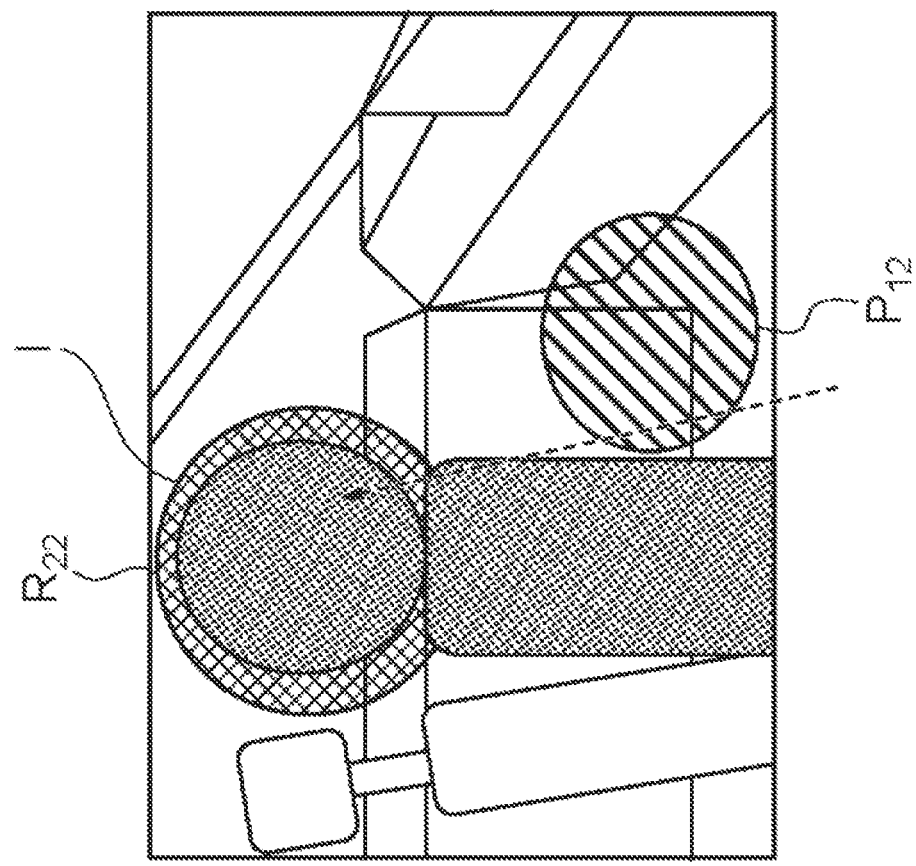
FIG. 11 illustrates an example of candidates for the attention object presented to the occupant in the scene illustrated in FIG. 10.

The functions of the sound data processing device 5 according to the present embodiment will be described with reference to FIGS. 10 to 12. FIG. 10 illustrates an example of a scene in which an occupant wearing a head-mounted display has a dialogue with an icon. FIG. 10 corresponds to the scene of FIG. 4 used in the description of the first embodiment. In FIG. 10, the occupant $U_1$ wears a head-mounted display (HD). In FIG. 10, the gaze direction of the occupant $U_1$ is indicated by a dotted arrow.

The sound data processing device 5 according to the present embodiment has functions of presenting one or more candidates for the attention object to an occupant through the head-mounted display and allowing the occupant to select a candidate for the attention object in the process of specifying the attention object. FIG. 11 illustrates an example of candidates for the attention object presented to the occupant in the scene illustrated in FIG. 10. In FIG. 11, I represents an icon corresponding to a person in a remote place.

For example, the sound data processing device 5 acquires a captured image corresponding to the field of view of the occupant from the imaging device equipped in the head-mounted display. Then, as illustrated in the example of FIG. 11, the sound data processing device 5 superposes and displays $P_{12}$ and $P_{22}$ representing the positions of sound sources on the captured image in which the front passenger seat is captured. As illustrated in FIG. 11, the sound data processing device 5 presents the positions of sound sources to the occupant in a form in which the occupant can specify that another occupant is a sound source.

The sound data processing device 5 determines whether or not there is a plurality of candidates for the attention object on the screen which the occupant visually recognizes. When determining that there is a plurality of candidates for the attention object, the sound data processing device 5 determines whether or not there is a plurality of categories of the candidates. The categories are classified, for example, into occupants or icons, speakers, or the like. Additionally or alternatively, the categories may be classified in accordance with whether or not they can be controlled via a system other than the sound output system 100.

When determining that there is a plurality of categories of candidates for the attention object, the sound data processing device 5 requests the occupant to select the attention object. The sound data processing device 5 specifies one candidate for the attention object, which is selected by the occupant, as the attention object. $P_{12}$ and $P_{22}$ illustrated in FIG. 11 correspond to $P_{12}$ and $P_{22}$ illustrated in FIG. 3.

Figure 12:
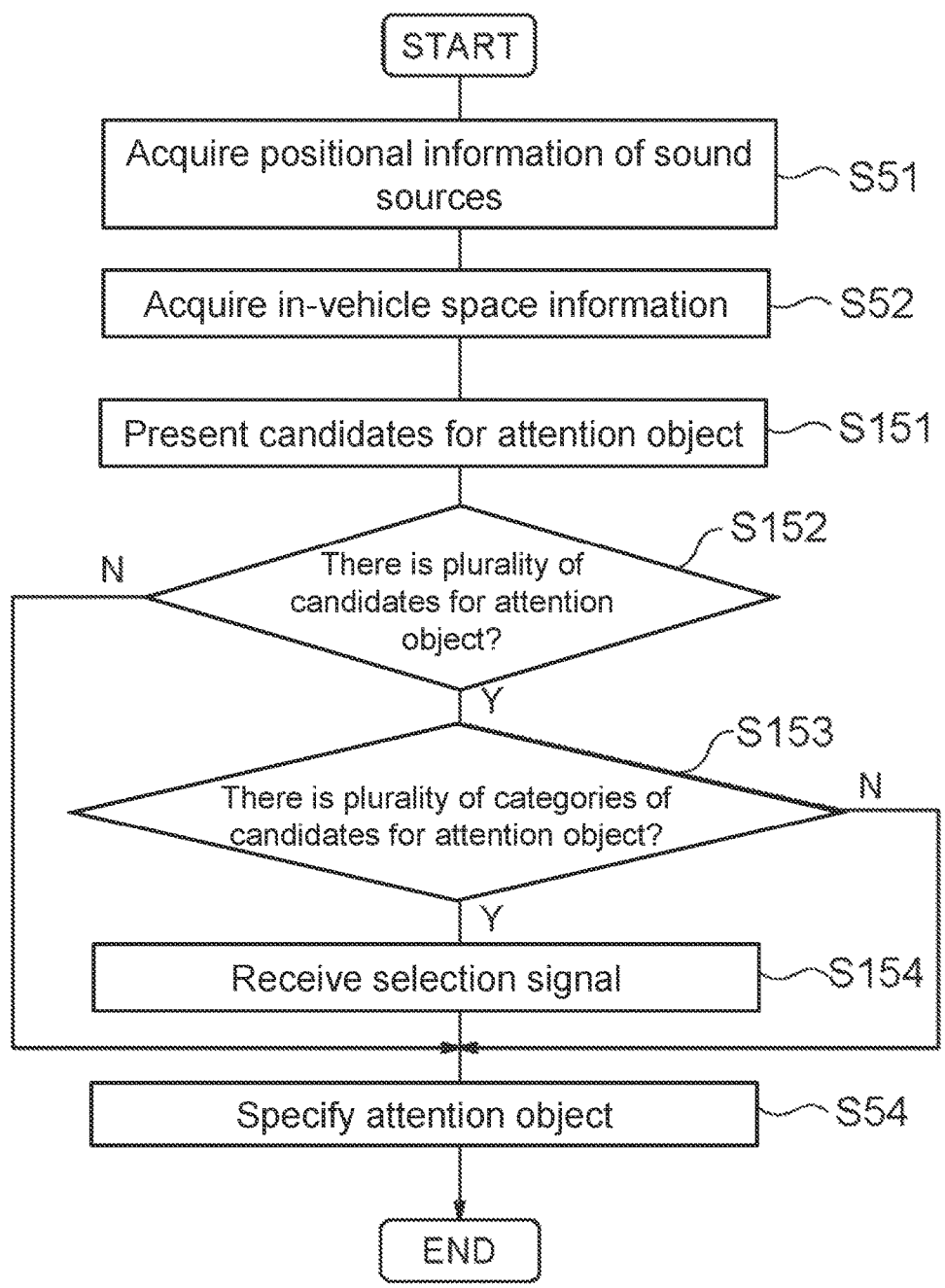
FIG. 12 illustrates a subroutine of step S5 illustrated in FIG. 7, which is a subroutine according to a second embodiment.

FIG. 12 illustrates a subroutine of step S5 illustrated in FIG. 7, which is a subroutine according to the present embodiment. From another aspect, FIG. 12 is a diagram for describing a method of specifying an attention object, which is executed by the sound data processing device 5 according to the present embodiment. In FIG. 12, the same processing as that of the subroutine of step S5 illustrated in FIG. 7 according to the first embodiment is denoted by the same reference numerals as those in FIG. 7, and the description will be borrowed herein.

In step S151, the sound data processing device 5 presents one or more candidates for the attention object. For example, the sound data processing device 5 presents a plurality of candidates for the attention object in the form illustrated in the example of FIG. 11.

In step S152, the sound data processing device 5 determines whether or not there is a plurality of candidates for the attention object presented in step S151. When a determination is made that there is a plurality of candidates for the attention object, the process proceeds to step S153, while when a determination is made that is not a plurality of candidates for the attention object, the process proceeds to step S54.

When a determination is made in step S152 that there is a plurality of candidates for the attention object, the process proceeds to step S153. In step S153, the sound data processing device 5 determines whether or not there is a plurality of categories of the candidates for the attention object. When a determination is made that there is a plurality of categories of the candidates for the attention object, the process proceeds to step S154, while when a determination is made that there is not a plurality of categories of the candidates for the attention object, the process proceeds to step S54.

When a determination is made in step S153 that there is a plurality of categories of the candidates for the attention object, the process proceeds to step S154. In step S154, the sound data processing device 5 receives a selection signal from the occupant. For example, the occupant makes a gesture such as pointing by finger thereby to select one candidate for the attention object from the plurality of candidates for the attention object. When the process in step S154 is completed, the process proceeds to step S54, in which the attention object is specified.

Thus, in the present embodiment, the sound data processing device 5 is applied to the head-mounted display type device equipped with an AR technique. This allows the occupant to select an attention object when specifying the attention object, and the sound which the occupant wants to listen to carefully can be accurately emphasized and output. Moreover, an object that does not actually exist but outputs a sound, such as an icon, can be included in the attention objects. As a result, the targets of sounds which the occupant wants to listen to carefully can be augmented.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described first embodiment, the method of specifying an attention object has been described by exemplifying a method using the positional information of sound sources or the in-vehicle space information, but the attention object may be specified by using at least one of the positional information of sound sources and the in-vehicle space information. For example, the attention object may be specified by using only the positional information of sound sources, or the attention object may also be specified by using only the in-vehicle space information. Additionally or alternatively, for example, when the attention object cannot be specified by using the positional information of sound sources, the method of specifying the attention object by using the in-vehicle space information may be adopted.

In the above-described second embodiment, for example, some of the functions of the sound data processing device 5 may use the functions of the head-mounted display type device. For example, when the head-mounted display is equipped with an imaging device that captures an image of the surroundings, a microphone that acquires the voice of an occupant, etc., the sound data processing device 5 may use these devices or equipment to acquire information regarding the movement, line of sight, and voice of the occupant.

Then, the sound data processing device 5 may perform processing of occupant's motion recognition, occupant's line-of-sight recognition, or occupant's utterance recognition using the acquired information.

DESCRIPTION OF REFERENCE NUMERALS

- 1 Sound collecting device
- 2 Imaging device
- 3 Database
- 4 Output device
- 5 Sound data processing device
    - 50 Control device
        - 150 Sound data acquisition unit
        - 160 Attention object specifying unit
            - 161 Motion recognition unit
            - 162 Line-of-sight recognition unit
            - 163 Utterance content recognition unit
            - 164 Sound source specifying unit
        - 170 Sound data processing unit
            - 171 Type determination unit
            - 172 Sound signal processing unit
        - 180 Sound data output unit
    - 51 Storage device
- 100 Sound output system

The invention claimed is:

1. A sound data processing device comprising:
a sound collecting device, an imaging device for capturing a cabin of a vehicle, a speaker, a database, an output device, a sound data processing device, and a control device,
the control device being configured to:
acquire first sound data in a cabin of a vehicle from the sound collecting device;
acquire position information of a sound source, including installation position of the speaker installed in the cabin and position of an occupant in a state of sitting in a seat;
specify an attention object that is an object to which an occupant (U) of the vehicle directs attention and the sound source corresponding to the attention object, based on a captured image captured by the imaging device and the position information of the sound source, wherein a first occupant is specified as the sound source when a conversation is held between the occupant (U) and the first occupant and the speaker is specified as the sound source when the occupant (U) is gazing at a device in the cabin;
recognize a second occupant conversing with the first occupant as a related object in the cabin in which the occupant (U), the first occupant, and the second occupant are conversing;
generate second sound data from the first sound data by emphasizing sound related to the attention object and the related object without changing a number of sound sources of sound heard by the occupant and a sound position at which a sound image is localized with reference to the occupant; and
output the second sound data from the speaker to the occupant.

2. The sound data processing device according to claim 1, wherein the control device is configured to:
acquire the captured image of the occupant from an imaging device;
recognize, based on the captured image, a pointed position or a pointed direction which the occupant points by finger;
acquire positional information of the object in the cabin from a storage device; and
specify the attention object based on the pointed position or pointed direction and the positional information.

3. The sound data processing device according to claim 1, wherein the control device is configured to:
acquire the captured image of the occupant from an imaging device;
recognize, based on the captured image, a gaze position at which the occupant is gazing or a gaze direction in which the occupant is gazing;
acquire positional information of the object in the cabin from a storage device; and
specify the attention object based on the gaze position or gaze direction and the positional information.

4. The sound data processing device according to claim 1, wherein the control device is configured to:
acquire a voice of the occupant from a device that collects sounds and voices in the cabin;
recognizes utterance content of the occupant based on the voice of the occupant; and
specify the attention object based on the utterance content.

5. The sound data processing device according to claim 1, wherein the sound relating to the attention object is a sound that is output from the attention object.

6. The sound data processing device according to claim 1, wherein the sound relating to the attention object is output from the related object.

7. The sound data processing device according to claim 1, wherein the sound relating to the attention object is output from the attention object and output from the related object.

8. The sound data processing device according to claim 1, wherein when third sound data that is data about the sound relating to the attention object can be acquired from a given system, the control device is configured to execute a process of superposing the third sound data on the first sound data to generate the second sound data.

9. The sound data processing device according to claim 1, wherein when third sound data that is data about the sound relating to the attention object cannot be acquired from a given system, the control device is configured to execute a sound emphasizing process for the third sound data included in the first sound data to generate the second sound data.

10. The sound data processing device according to claim 1, wherein the control device is configured to acquire the first sound data from a device that performs binaural recording of a sound generated in the cabin.

11. The sound data processing device according to claim 1, wherein the control device is configured to specify the attention object and then determines whether or not the occupant is directing attention to the attention object, and
when determining that attention of the occupant is not directed to the attention object, stop generation of the second sound data.

12. A sound data processing method executed by a processor, comprising:
acquiring first sound data in a cabin of a vehicle from a sound collecting device;
acquiring position information of a sound source, including installation position of a speaker installed in the cabin and position of an occupant in a state of sitting in a seat;
specifying an attention object that is an object to which an occupant (U) of the vehicle directs attention and the sound source corresponding to the attention object, based on a captured image captured by an imaging device and the position information of the sound source, wherein a first occupant is specified as the sound source when a conversation is held between the occupant (U) and the first occupant and the speaker is specified as the sound source when the occupant (U) is gazing at a device in the cabin;

recognizing a second occupant conversing with the first occupant as a related object in the cabin in which the occupant (U), the first occupant, and the second occupant are conversing;

generating second sound data from the first sound data by emphasizing sound related to the attention object and the related object without changing a number of sound sources of sound heard by the occupant and a sound position at which sound image is localized with reference to the occupant; and outputting the second sound data from a speaker to the occupant.

13. The sound data processing device according to claim 1, wherein when a specific occupant among conversation occupants participating in a conversation directs attention to the attention object, the sound data processing device is configured to recognize the conversation occupant other than the specific occupant to the related object.

* * * * *